(12) United States Patent
Robey

(10) Patent No.: US 6,663,273 B2
(45) Date of Patent: Dec. 16, 2003

(54) HORIZONTAL CAROUSEL POSITION LIGHT SYSTEM

(75) Inventor: Timothy Robey, Windham, ME (US)

(73) Assignee: Bellheimer Metallwerk GmbH, Belleheim/Pfalz (DE)

(*) Notice: Subject to any disclaimer, the term of this patent is extended or adjusted under 35 U.S.C. 154(b) by 0 days.

(21) Appl. No.: 10/075,276

(22) Filed: Feb. 15, 2002

(65) Prior Publication Data

US 2003/0156427 A1 Aug. 21, 2003

(51) Int. Cl.$^7$ .................. B64D 47/06; F21V 5/00; G09F 13/18
(52) U.S. Cl. .................. 362/559; 362/133; 362/253; 362/551; 362/576; 340/815.42; 340/686.2
(58) Field of Search .................. 362/559, 127, 362/133, 563, 564, 253, 551, 125, 576; 312/223.5; 340/815.42, 815.58, 686.2; 211/122

(56) References Cited

U.S. PATENT DOCUMENTS

| | | | | |
|---|---|---|---|---|
| 3,838,266 A | * | 9/1974 | Jonathan | 362/127 |
| 4,918,579 A | * | 4/1990 | Bennett | 362/559 |
| 5,330,062 A | * | 7/1994 | Murphree | 211/122 |
| 5,670,778 A | | 9/1997 | Smith | |
| 5,790,374 A | * | 8/1998 | Wong | 361/685 |
| 5,799,124 A | * | 8/1998 | Zorn et al. | 385/125 |

OTHER PUBLICATIONS

Connors et al., U.S. Publication US 2002/0147597 A1, Oct. 10, 2002.*
Remstar Pick–Light Technology, Remstar International Inc., Aug. 1998, 2 pages.
Horizontal Carousels Catalog, Remstar International Inc., no date, 6 pages.

* cited by examiner

Primary Examiner—Sandra O'Shea
Assistant Examiner—Sharon Payne
(74) Attorney, Agent, or Firm—Crowell & Moring LLP (57) ABSTRACT

A storage and/or retrieval system such as a horizontal carousel has a common light source array consisting of LED's and the like inside the system's rotating or movable carrier loop at a picking or storage access area behind the shelves of a selected carrier. When that carrier is at the desired access position, the common light source transmits light through light transmitting devices to an access face of the carrier at the picking or storing location in relative proximity to the actual compartment's position. The light transmitting devices can be flexible light pipes arranged in patterns dictated by the type of storage required.

19 Claims, 9 Drawing Sheets

HORIZONTAL CAROUSEL POSITION LIGHT SYSTEM

BACKGROUND OF THE INVENTION

The present invention relates to a storage and retrieval system and, more particularly, by way of example, a horizontal carousel system which includes a light source with lights arranged in an array configured according to a particular requirement of the carousel system, and light transmission components that transfer the light source, which can be stationary or movable, from a common point to a visible point on an access face of at least one movable carrier directly associated with a storage position.

Conventional horizontal carousel systems include one or more rotating carousels with carriers and shelves. A column of vertically disposed indicator lights (collectively known as a light tower) is typically positioned to one side of the carousel adjacent to a carrier selectively driven to the access position. When the carousel is rotated, thereby bringing a particular carrier to the operator's access point, one of several shelf height indicator lights on the adjacent light tower is illuminated. However, the illuminated light of this tower is typically located at a distance from the actual item, its possible storage container (tote box) and from the shelf of the selected carrier.

The light tower's indicator device also typically displays a "position" reference (e.g., "03") which indicates that the operator should count over to, say, the third tote box for the location of the desired item on the shelf of the selected carrier. This arrangement has the disadvantage of having a relatively large distance from the illuminated light on the tower obscuring the relationship between the light and the associated item; shelf position, and potentially causing misdirected picking operations and increased picking times, particularly when the vertical spacing of the shelves is small.

In addition, the conventional light tower indicator devices, are relatively expensive pieces of equipment, particularly where a position reference is employed to direct the operator to the tote which has the desired item for access.

SUMMARY OF THE INVENTION

An object of the present invention is to provide an improved indicator system for storing and retrieving items in horizontal carousels and other automated devices which overcomes the disadvantages encountered with prior art electronic pick indicator systems in a simple and cost-effective manner.

This object has been achieved in accordance with the present invention by providing a common light source array created by LEDs, incandescent bulbs, lasers, etc. inside the storage device's rotating or movable carrier loop, at the picking or storage access area behind a selected carrier and associated storage shelves, such that, when the selected carrier is at the access position, the light is transmitted from the common light source to the face of the picking or storing location in relative proximity to the actual compartment's position.

According to another important aspect of the present invention, an array of lights can be configured to a storage system's particular usage requirements. That is, more or less lights can be employed depending upon the product or box sizes, the number of positions on the shelves, the different number of shelves on the carriers, and the desired operation of the equipment. A significant advantage of the present invention is its flexibility at minimum constructional cost.

In accordance with one currently contemplated embodiment of the present invention, a common light source is not required on each moving carrier but only at a designated picking area behind the stored items. This has the advantage of minimizing the cost of the light source inasmuch as only one light source is required for each picking station on each carousel, potentially serving all carriers within the machine rather than requiring one for each rotating carrier.

A further advantage of the present invention is that the light source is behind the carrier as well as behind the supply of stored items and/or containers. Thus, the light source is hidden from an operator's view by carriers, totes or stored items so as to be able to direct the operator to the precise location where picking is to take place without any thought on the operator's part. The present invention contemplates the use of light transmission devices such as light pipes at each position of the carrier shelf where needed or desired to transfer the light from the hidden or blocked stationary light source behind the carrier to a point or points on the face of the storage shelf where an operator's attention would be quickly gained to grant immediate recognition of the tote or tray from which one or more of the items are to be picked.

The present invention is based on a recognition that the light transmission devices are a simple and inexpensive medium to move the light from a point behind the carrier to the face of the carrier where, for example, light pipe tips indicate the picking positions, typically at locations below the storage containers or tote boxes or below the actual items or parts.

An advantage of a light pipe system is that it serves as a medium to move the common light source from a relatively stationary position behind the carrier to the actual item's position.

It is further contemplated that light pipes can be installed on each carrier shelf in patterns dictated by the type of storage required. In other words, more or less light pipes can be used at each shelf level depending upon the sizes and/or quantities of the stored items on that shelf.

Another advantage of the present invention when used with conventional horizontal carousels is that the carousel typically positions the operator access point in the end radius of the machine where it may be difficult to have a straight path between the light source and the indicator point without creating interference with the rotating components of the machine, particularly near the outside edges of the shelf. The present invention overcomes this disadvantage by light pipes which can be bent or formed or otherwise configured to transfer the light from a centralized position on or in the machine to the shelf position itself. It also allows the lights to be employed on systems where the operator access point is from the side of the carrier, rather than the face, by bending the light pipe approximately 90 degrees.

A further advantage of the present invention is that the operator can now have an indication of the exact left-right position for the selected item, as well as of the transaction quantity. The tips of the light pipes can, if desired, be labeled with quantity indicators such as "1" or "2" so that the operator also has the transaction quantity directly at the point of access for storing or picking. Quantities that are not included in the "typical" tip would be shown via a non-labeled light pipe tip so as to cause the operator to refer to a common quantity display adjacent (above, below or to the side) to the picking/storage area. It is also contemplated that the tip could "blink out" a pattern for accessing small quantities of items, for example, two blinks followed by a pause which could indicate a transaction (store or retrieve) quantity of two.

BRIEF DESCRIPTION OF THE DRAWINGS

Other objects, advantages and novel features of the present invention will become apparent from the following detailed description of the invention when considered in conjunction with the following figures.

DETAILED DESCRIPTION OF THE DRAWINGS

Figure 1:
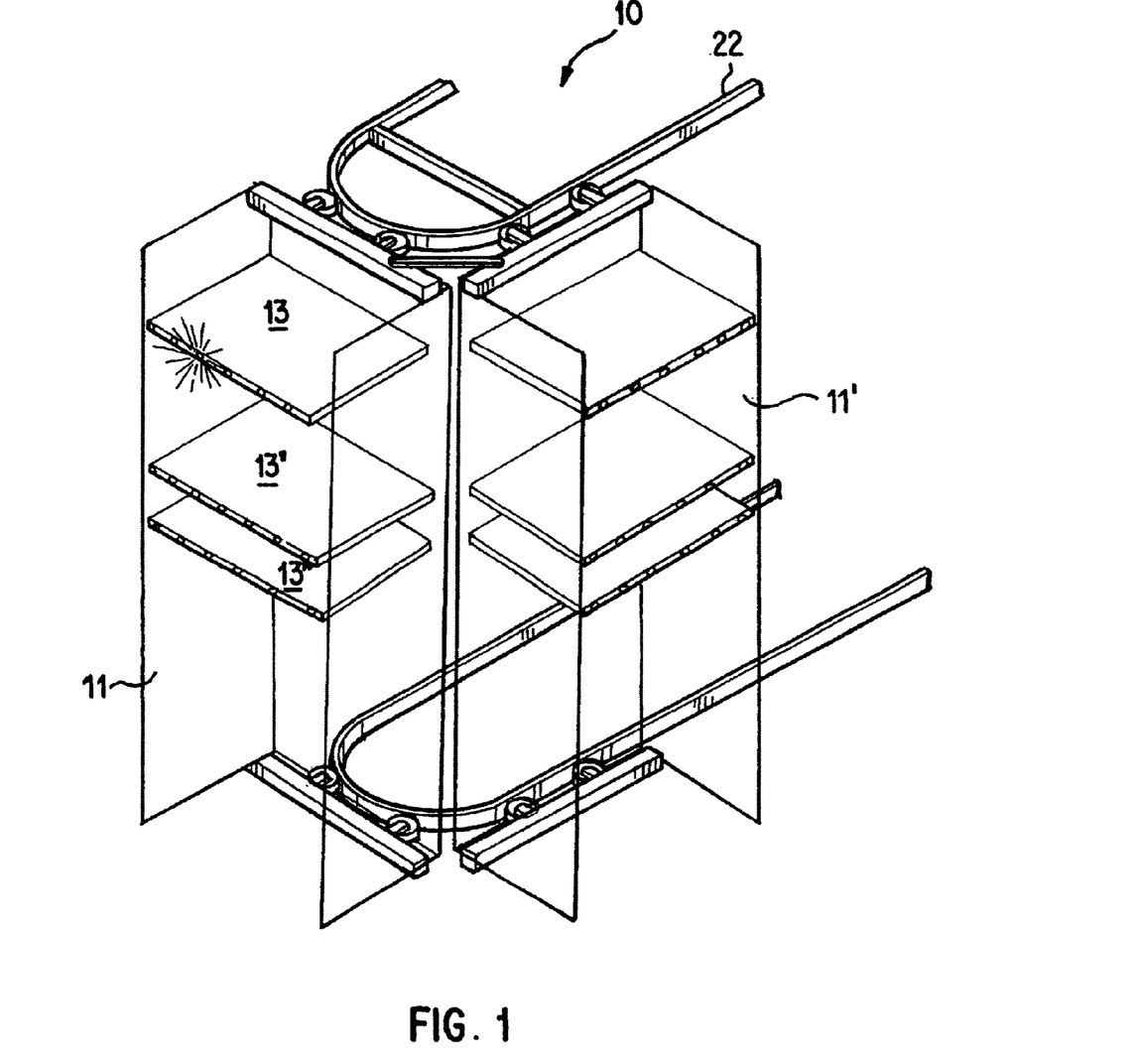
FIG. 1 is a partial perspective view of a horizontal carousel picking system of generally known type showing a carrier at the access point and the immediate adjacent carrier with one of the light pipes illuminated.

FIG. 1 shows one end of a storage system, in particular a horizontal carousel picking system of generally known type designated generally by the numeral 10. A further description of the carousel is deemed unnecessary as these systems are well known. One or more carriers 11, 11', . . . containing totes or trays in different size and shape configurations 14, 14', 14", . . . (FIGS. 4A and 8A–C) can be arranged on the shelves 13 of carriers 11, 11', etc. which are shown in this particular application as three-sided devices. Of course, all other conventional forms of carriers and shelves are contemplated as within the scope of the present invention. In a conventional position light system, an electronic pick indicator, as previously noted, is arranged at the side of the carrier or between two adjacent carriers on opposing carousels. The known system has a series of vertically displaced lights, one or more of which can be illuminated to indicate the shelf for item selection. Likewise, a position reference can be displayed to indicate to the operator which of possible multiple tote boxes on the shelf should be selected for the desired item. As also mentioned above, such an arrangement in which the pick indicator is spaced from the actual item compartment can cause misdirected picking operations and also increase the picking times, particularly where the vertical spacing of the shelves is small.

Figure 2:
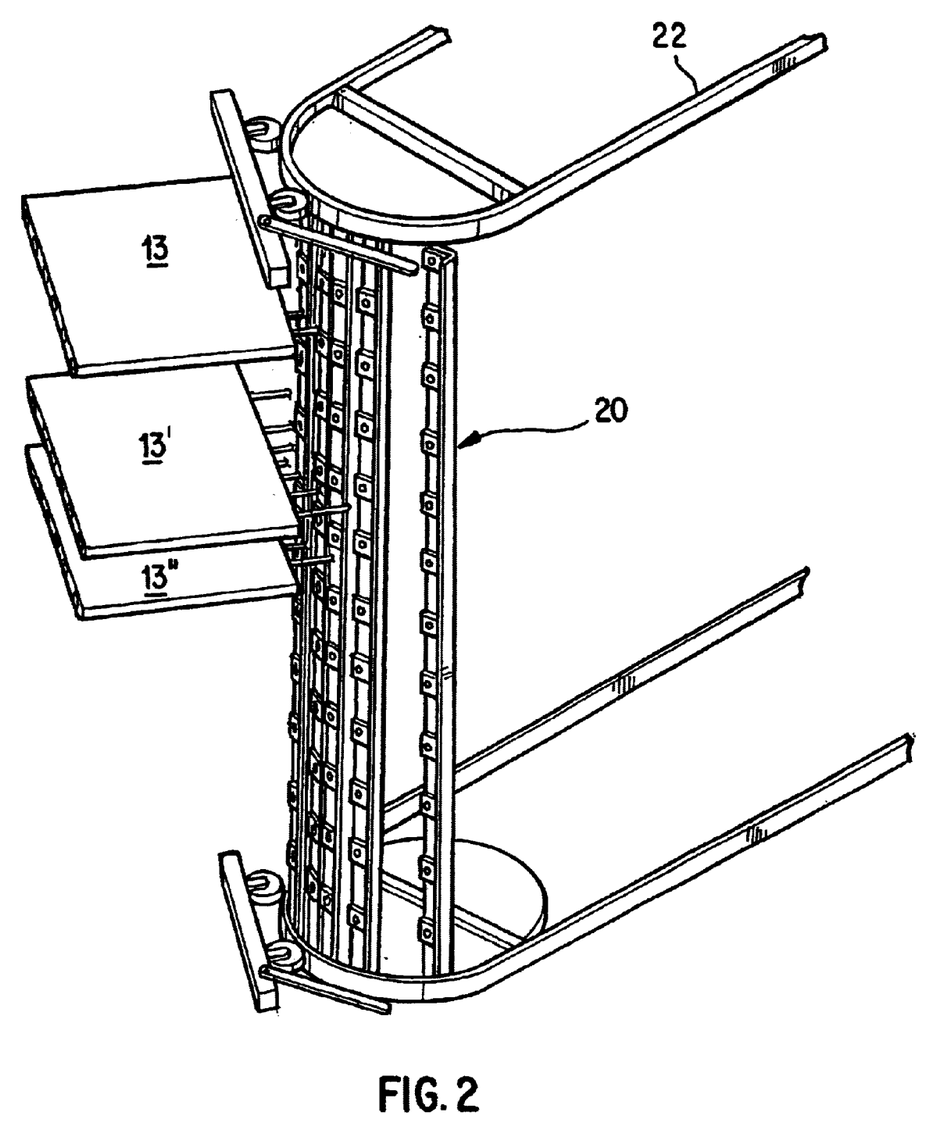
FIG. 2 is a perspective view similar to FIG. 1 but showing only shelves of a carrier adjacent the access point and the arrangement of five light source arrays behind the carriers.
Figure 5A:
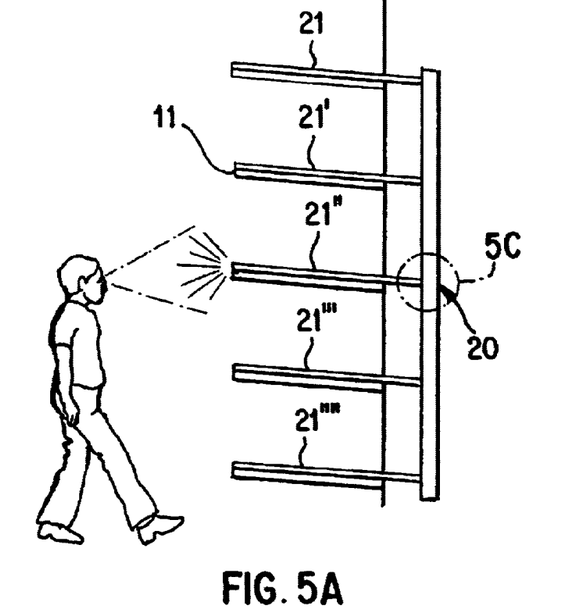
FIGS. 5A and 5B are side and end schematic views of the carousel shown in FIGS. 1 and 2 showing how an operator sees the activated light pipe(s), the latter being illustrated by diverging lines at the end of the light source and light pipe.
Figure 5B:
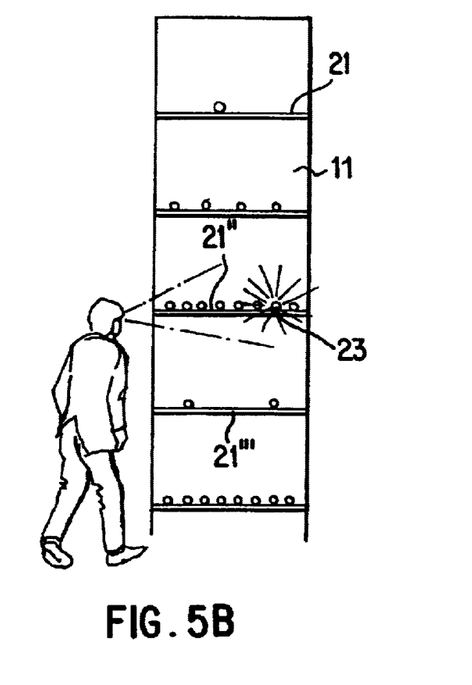
Figure 5C:
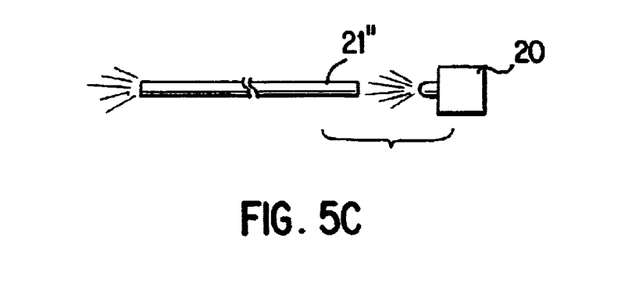
FIG. 5C is an isolated view from the circled portion of FIG. 5A showing the transmission of light from an indicator light through a light pipe.

To overcome the disadvantages in the conventional picking systems, the present invention, which is illustrated schematically in FIG. 2 et seq., places light sources designed generally by numeral 20 (five arrays of such sources being shown in FIGS. 2 and 3) disposed inside the horizontal carousel's rotating carrier loop 22. FIGS. 5A and 5B show side and front views of one of the rotating carriers, i.e., the carrier 11 that has reached a picking access area immediately in front of the position light source 20. The operator (shown at the left in FIGS. 5A and 5B) can then see which particular light pipe in the rows of light pipes 21, 21', etc. has been lit, in this case the mid-level light pipe row 21" which has radially diverging lines (at the left end in FIG. 5A) to show schematically light rays emanating from the light pipe's tip. With respect to FIG. 5B, the specific mid-level light pipe 22 is shown, in this case the second light pipe from the right. FIG. 5C is an isolated view showing the separation between the light source 20 and the associated light pipe 21" on the selected shelf of the carrier 11.

The common light source shown here, for example, in the form of a vertical tower or towers 20 is stationary in the above-described embodiment and arranged at a designated picking access area behind the stored items. It is contemplated, however, that the light source can also be movable in order to decrease the air gap to the light pipe, thereby creating a better transfer of light and consequently a brighter tip. The light structure in this case would be moved slightly towards the carrier back after the carousel has stopped in its picking position. Different numbers of light pipes can be arranged per shelf on each carrier as seen in rows 21 and 21''' in FIG. 5B, and they can be mounted in numerous fashions including towers for one example.

Figure 3:
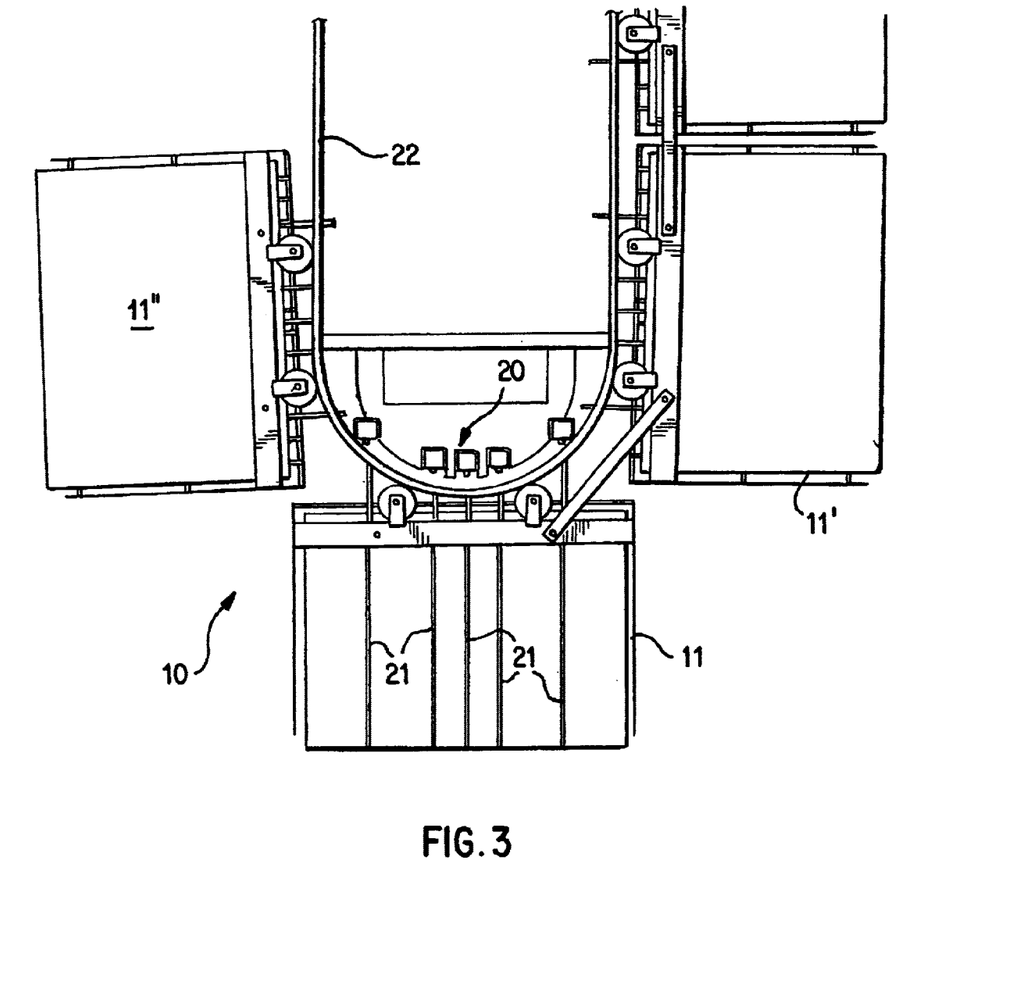
FIG. 3 is a top view of the end of the horizontal carousel shown in FIG. 2 showing the five arrays strategically located in the radius to align with straight light pipes without mechanical interference.
Figure 4:
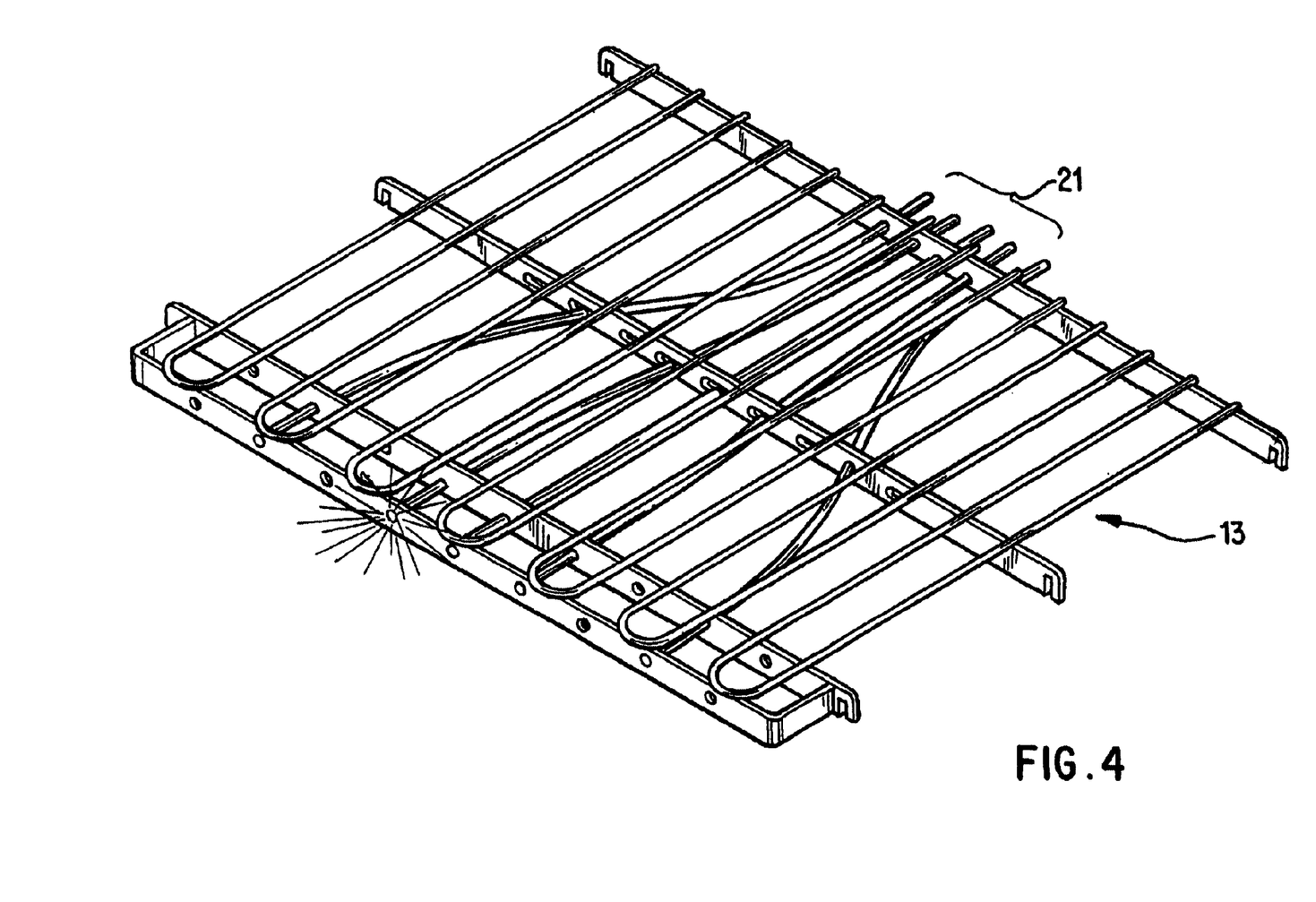
FIG. 4 is a perspective view of one embodiment of a carrier shelf of FIGS. 1 and 2 with multiple light pipes but without totes or trays thereon.
Figures 6A, 6B:
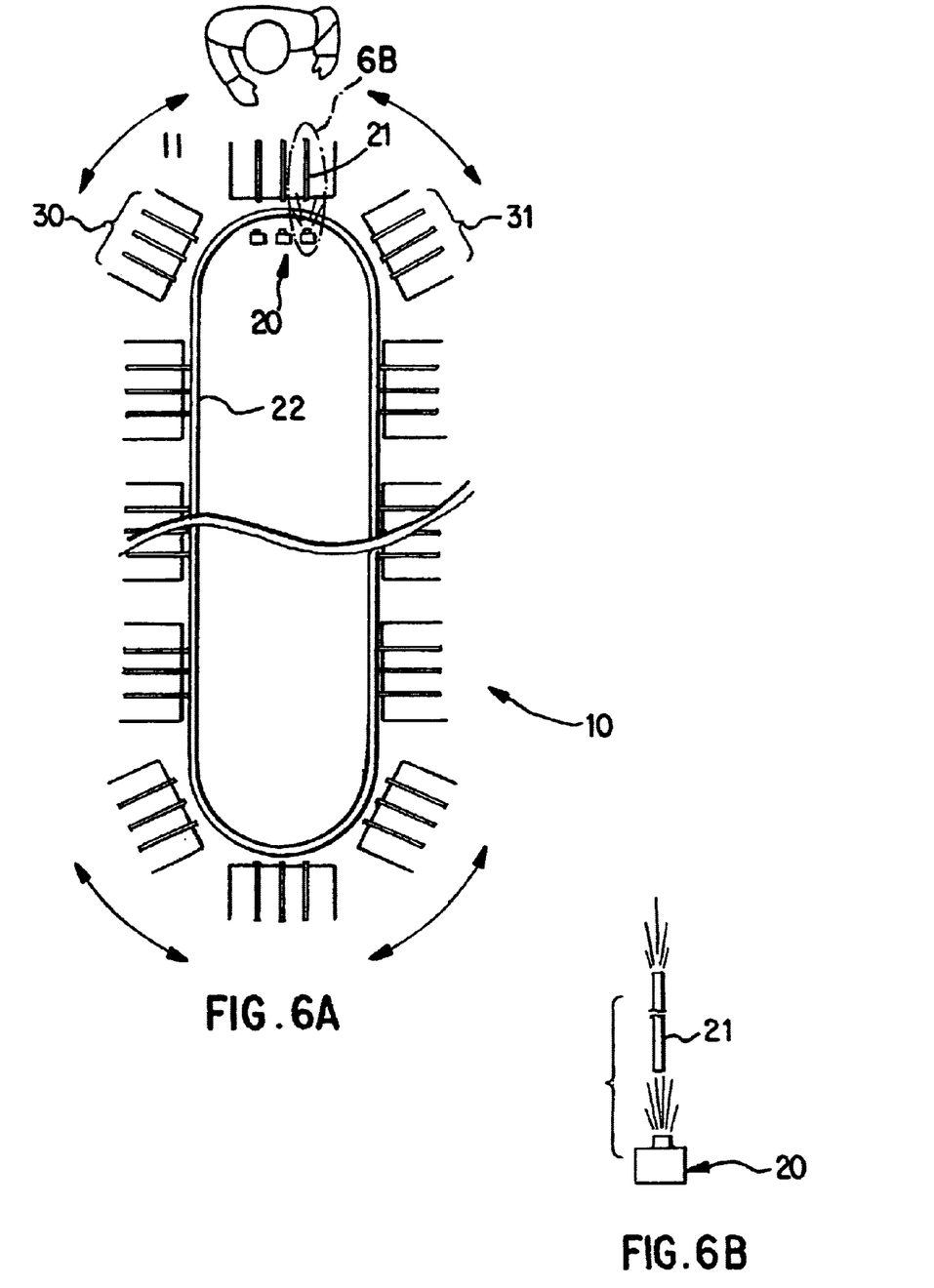
FIG. 6A is a plan schematic view of a complete horizontal carousel showing three light source arrays at an access position.
FIG. 6B is an isolated view of one of the arrays in the circled area of FIG. 6A transmitting light through the associated straight light pipe on the carrier located at an access position.

FIG. 3 shows one example of how the towers can be arranged in the radius of the carousel when the light pipes 21 on a shelf are to be constructed as straight pipes. FIG. 4 shows another embodiment of a shelf 13 in which five light pipes 21 extend from the front to the back of the shelf 13, so that each of the light pipes employed will be aligned with the common light sources at one central area rather than distributed across the width (FIG. 3) and still extend out to a much wider area on the moving carrier as also seen in FIG. 5B. Conventional horizontal carriers commonly position the operator access point at or near the end radius of the carousel as best seen in FIG. 6A, which also shows common alternate access points 30, 31. This makes it difficult to have a straight line path between the light source and the indicator point visible to the operator, due to the mechanical clearances required for carrier movement in this area. As seen in FIG. 4, the light pipes can be bent (if made of flexible material), formed or molded so that they have a relatively narrow and uniform spacing at the center proximity of the rear of the shelf to correspond to the number of lights on each row of the light source array while extending to the appropriate tote or tray position at the front of the shelf visible to the operator. FIG. 4 shows five light pipes but the numbers can vary depending on the application requirements. An advantage of this arrangement is that interference between the position light system and the rotating components is avoided. The light pipes can, however, be straight elements (FIG. 3) when spaced a distance from the outside edge of the shelf 13, 13', etc., and the light source can also be made movable to avoid interference areas at the end radius of the carousel and to increase brightness by bringing the light source closer to the light transmitting devices. The light sources can also contain focusing lenses or simply brighter intensities to allow them to be placed at a greater distance from the light pipes.

Figure 4A:
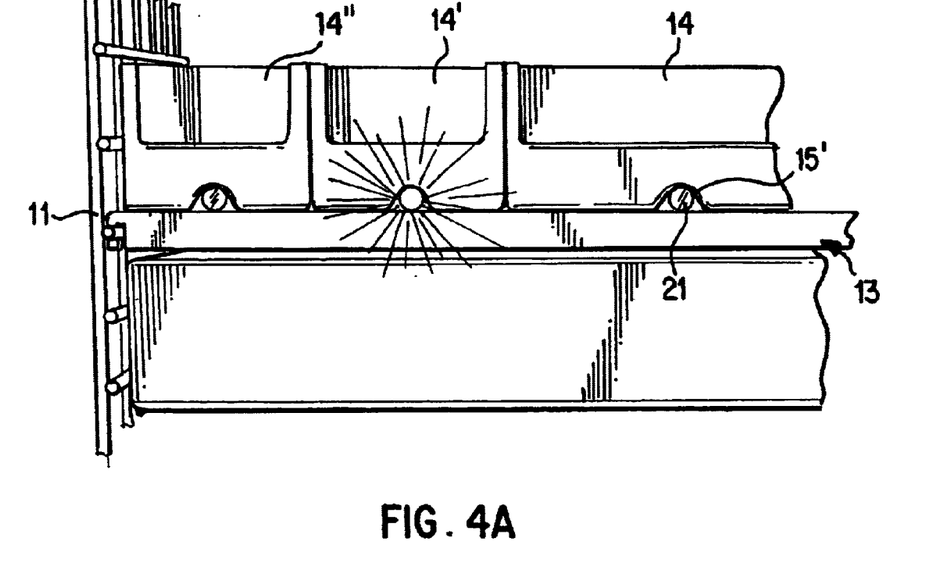
FIG. 4A is a partial front view of another embodiment of the shelf in which the totes are recessed to accommodate a light pipe.
Figure 4B:
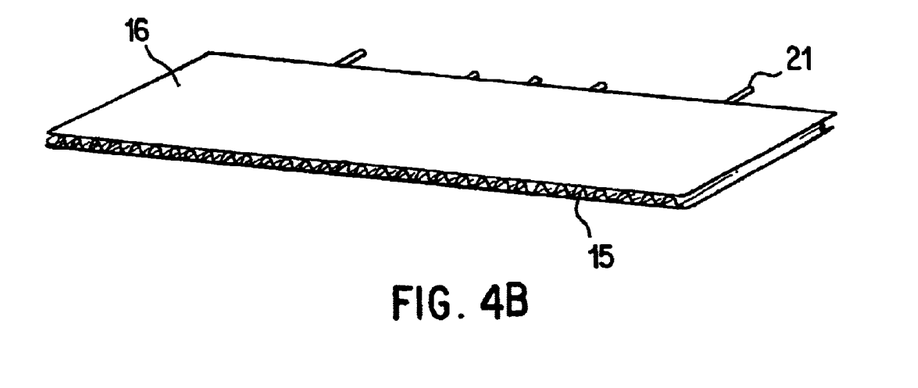
FIG. 4B is a perspective view of a currently preferred embodiment of a carrier shelf which utilizes corrugated shelf floors to accommodate the light pipes.

FIGS. 4A and 4B show a currently-contemplated preferred embodiment of a floor 16 in which a corrugated material such as cardboard or plastic or the like can be used to accommodate the light pipes 21 seen extended toward the light source from one side of the floor 16 to the viewing tip 15. This floor then would be placed between the shelf and the totes, and the pipes 21 would be slid into the corrugation flutes 15 from front to back. Such an arrangement allows use of standard shelf structures, and provides an economical housing for the light pipes protecting them from interfering with or being damaged by the product above.

Figure 8A:
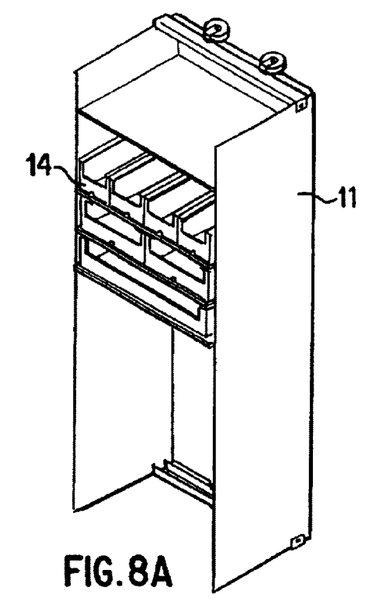
FIGS. 8A, 8B and 8C are respectively perspective views of a carrier in which the light pipes are incorporated in the totes, a partial view of the carrier showing an exposed shelf for the totes, and an enlarged view of the totes shown in FIGS. 8A and 8B.
Figure 8B:
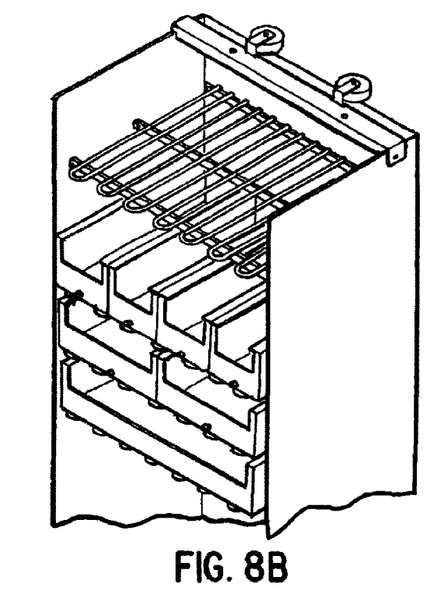
Figure 8C:
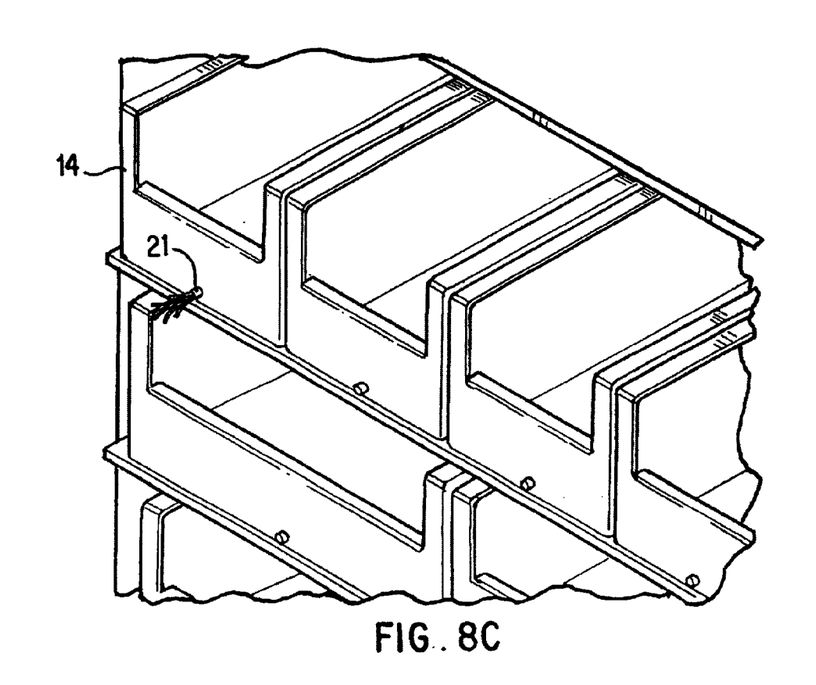

FIGS. 8A–C are front perspectives of another embodiment showing how a representative light pipe 21 can be implanted directly in the tote's bottom. Alternatively, the shelf 13 can be recessed in a manner not illustrated but easily understood to allow the use of generic totes and trays by keeping the top of the light pipe even with the shelf upper surface.

The light pipes can be made of any material that will transmit light (typically clear plastic rods or glass fibers), and in any suitable shape, e.g. round, square, rectangular, octagonal, etc. The tips of the pipes can be machined to be flat, round or prismatic, or a separate diffusing lens can be added, again with the intention to maximize the intensity of the light transmission at the access point tip. Flexible light pipe material is particularly contemplated as it will allow the pipes to conform to different configurations. If a single light pipe is used, for example, it may remain with a rectilinear axis, whereas two or more such pipes may have to be bent as seen in the five-pipe shelf configuration in FIG. 4. Multiple light pipe tips could also be illuminated under one container position to provide even more recognition for the operator.

The tips of the light pipes can also be pre-labeled with a number such as "1" or "2" because typical applications have been measured over time to show an average quantity to be between 1 or 2 items per transaction. This gives the operator both the exact left-right position of the item(s) to be picked as well as the quantity. Light pipes used for non-typical quantities can remain blank or be pre-labeled with a symbol such as "?" to make the operator refer to a quantity display adjacent the picking area.

Figure 7A:
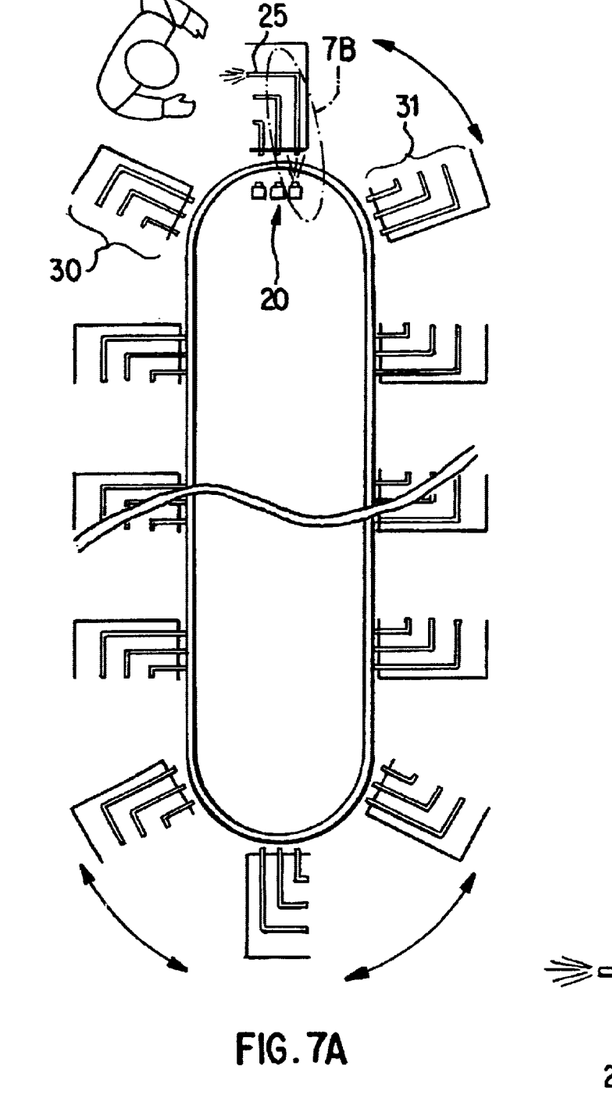
FIGS. 7A and 7B are views similar to FIGS. 6A and 6B but of an embodiment in which the light pipers are L-shaped so as to provide for access indication at a different position.
Figure 7B:
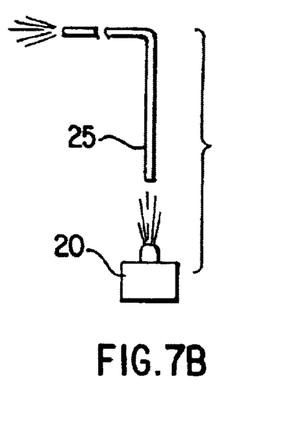

FIGS. 6A and 6B illustrate in plan view an embodiment in which only three light towers 20 are used in the central area of the carousel loop. The arrows indicate that the carriers can be rotated either clockwise or counterclockwise, and that the operator can see the lit pipe(s) at the access (picking/storing) positions. FIGS. 7A and 7B illustrate another embodiment in which the operator is picking or storing from the side of the carousel and is able to view the lit pipe(s) which is/are in an L-shaped configuration as better seen in the isolated view.

The foregoing disclosure has been set forth merely to illustrate the invention and is not intended to be limiting. Since modifications of the disclosed embodiments incorporating the spirit and substance of the invention may occur to persons skilled in the art, the invention should be construed to include every thing within the scope of the appended claims and equivalents thereof.

What is claimed is:

1. A storage and/or retrieval system, comprising:
    at least one carrier movable in a horizontal carousel system having at least one light transmission element associated therewith; and
    a light source located at a point of access to contents of a selected one of the at least one movable carrier, wherein the selected carrier is positioned relative to the light source and an operator so as to transmit light through the at least one light transmission element at a location of items to be picked from or returned to a shelf of the selected carrier.

2. The system according to claim 1, wherein at least one light transmission element is arranged in a non-linear configuration.

3. The system according to claim 1, wherein a light pipe is associated with and contained within respective totes or trays carried on the shelf of the at least one movable carrier.

4. The system according to claim 1, wherein the at least one light transmission element is labeled with a quantity of an item to be stored or picked at a particular location.

5. The system according to claim 1, wherein the light source is stationary.

6. The system according to claim 1, wherein the light source conveys a quantity of the items to be selected with an appropriate number of blinks from the light source.

7. A position system for use in a storage and/or retrieval apparatus, comprising;
    a light source; and
    means associated with a carrier movable in a horizontal carousel system for transmitting light from the light source located on one side of the movable carrier to another side of the movable carrier so as to indicate at least one location of one or more items to be selected.

8. The system according to claim 7, wherein the means is a labeled light pipe for indicating a quantity of an item to be picked at a particular location.

9. The system according to claim 7, wherein the means is a light pipe which extends linearly or non-linearly.

10. The system according to claim 7, wherein the light source conveys a quantity of the items to be selected with an appropriate number of blinks from the light source.

11. A storage and/or retrieval system, comprising:
    a carrier movable in a horizontal carousel system having a light transmission element; and
    a light source;
    wherein the movable carrier is positioned relative to the light source so as to transmit light from the light source through the light transmission element to an edge of the movable carrier.

12. The system according to claim 11, wherein the edge of the movable carrier is a side edge of the movable carrier.

13. The system according to claim 11, wherein the edge of the movable carrier is a front edge of the movable carrier.

14. The system according to claim 11, wherein the light source conveys a quantity of an item to be selected from the movable carrier by a corresponding number of blinks from the light source.

15. The system according to claim 11, wherein the light transmission element is a light pipe.

16. A method of indicating a position of an item in a carrier, comprising:
    moving a carrier in a horizontal carousel system having a light transmission element to a position relative to a light source; and
    transmitting light from the light source through the light transmission element to an edge of the carrier at the position of the item in the carrier.

17. The method according to claim 16, wherein the edge of the movable carrier is a side edge of the movable carrier.

18. The method according to claim 16, wherein the edge of the movable carrier is a front edge of the movable carrier.

19. The method according to claim 16, further comprising conveying a quantity of an item to be selected from the movable carrier by blinking the light source with a corresponding number of blinks.

* * * * *